United States Patent [19]
Thompson

[11] 3,820,403
[45] June 28, 1974

[54] HUB AND DRUM BALANCING MACHINE
[76] Inventor: Lloyd G. Thompson, 725 E. Kennedy Blvd., Tampa, Fla. 33602
[22] Filed: Jan. 15, 1973
[21] Appl. No.: 323,902

[52] U.S. Cl. .................................. 73/480, 73/487
[51] Int. Cl. ............................................ G01m 1/12
[58] Field of Search .............. 73/66, 459, 480, 481, 73/482–487

[56] References Cited
UNITED STATES PATENTS

| | | | |
|---|---|---|---|
| 1,731,922 | 10/1929 | Eaton | 73/66 |
| 2,117,073 | 5/1938 | Wochner | 73/480 |
| 2,185,843 | 1/1940 | Fraser | 73/480 |
| 2,737,814 | 3/1956 | Loucks | 73/481 |
| 2,752,788 | 7/1956 | La Penta | 73/480 |
| 3,130,576 | 4/1964 | Giers et al. | 73/66 |
| 3,280,639 | 10/1966 | Vorpahl | 73/484 |

*Primary Examiner*—James J. Gill
*Attorney, Agent, or Firm*—Theodore D. Lindgren

[57] ABSTRACT

A balancing machine for hubs, brake drums and other rotating members which utilizes needle bearings and a vibrating support structure to reduce balancing errors caused by friction and a balancing method which requires separate balancing of the hub and brake drum as a part of the balancing of entire wheel assembly.

2 Claims, 4 Drawing Figures

PATENTED JUN 28 1974 3,820,403

HUB AND DRUM BALANCING MACHINE

BACKGROUND OF THE INVENTION

This invention relates to a rotary balancing machine for hubs, brake drums, and other rotating members.

More particularly, this invention relates to a rotary balancing machine which is of improved sensitivity and which is specifically designed for use with automotive and truck hubs and brake drums.

Still more particularly, this invention relates to a method for using the foregoing machine to balance hubs and brake drums as a part of the balancing of an entire wheel assembly.

It is well-known that static frictional forces are proportional to the compressive force on the contacting surface between two objects. The concept of static friction is commonly taught in basic physics courses using the example of a block at rest on an inclined plane and the determination of factors necessary to cause the block to slide. It is equally well-known that dynamic or viscous friction is proportional to the relative velocity between two contacting objects moving at different velocities. Dynamic frictional concepts are commonly taught in the study of servo-mechanism and the damping effect associated with the viscous friction of oiled bearings. That the two frictional forces differ in magnitude for a given circumstance and that the static frictional force is generally greater than the dynamic frictional force is readily ascertainable through observation of an automobile approaching a stop sign. A driver, while maintaining constant pressure on the automobile brakes, will observe a rather constant rate of deceleration until just before the automobile comes to a stop. At that point, static frictional forces replace dynamic frictional forces between the brake shoes and the brake drums of the automobile and the deceleration increases suddenly, often causing the front of the automobile to be visibly lowered. Parenthetically, this phenomena is of aid to policemen who are thus able to easily differentiate the driver who completely stops his vehicle from the driver who makes an illegal rolling stop.

SUMMARY OF THE INVENTION

The present invention relates to an improved wheel-balancing machine which substantially decreases the detrimental effects of static and dynamic friction insofar as those effects prevent the achievement of a true balance. The present invention also relates to an improved method of balancing using the foregoing machine, which method decreases imbalance resulting when a wheel assembly is placed under load.

The improved wheel-balancing machine is comprised of a wheel spindle or axle supported at either end by needle bearings, which in turn are supported by a harmonically vibrating supporting structure. The needle bearings act to reduce the detrimental effect of dynamic friction by reducing the contact surface area as compared to that of the vehicle wheel bearings. The vibrating supporting structure acts to reduce the detrimental effect of friction by decreasing the force between contacting surfaces as compared to the forces present in a non-vibrating supporting structure. The decrease in force occurs during a part of each vibration cycle.

The improved method of wheel balancing using the foregoing machine consists of a step-by-step procedure in which the brake drum and hub are balanced as a unit separate from the remainder of the wheel assembly including the rim and tire.

The second step of the procedure is the balancing of the entire assembly consisting of the rim, hub, brake drum and tire. The second step may be accomplished by using the machine or by injecting a tire-balancing fluid in the tire.

The methods of construction and operation are best understood from the following description of the preferred embodiment when read in conjunction with the accompanying drawing.

Wheel-balancing machines similar to the one considered in this invention, as taught by Bell in U.S. Pat. No. 2,214,758 and by Welch in U.S. Pat. No. 2,668,443, provide either limited or no decrease in the static and dynamic frictional forces present in the bearings of the balancing mechanism. The ability of the operator to achieve a true balance on any balancing machine is limited by the frictional forces present in the bearings of the balancing mechanism. The presence of the frictional forces tends to prevent indication of unbalance.

It is also well-known that normal wheel-balancing methods use the placement of weights on the wheel rim while the operator balances the hub, brake drum, rim and tire in one operation. In practice, however, this method of balancing often tends to create a further imbalance resulting in severe vibration problems. The exact cause of this phenomena is not completely understood, although it is known that the center of gravity of the hub, brake drum, rim and tire and the center of rotation should be identical for optimum rotary balance. It is apparent that conventional balancing techniques cause the two centers to be identical while the hub, brake drum, rim and tire are on the balancing machine. However, the centers differ slightly when the hub, brake drum, rim and tire are placed on the vehicle because the tire is forced out of its circular shape when placed under load, thus changing the weight distribution. It is also known that the various parts of the wheel assembly undergo differing angular and linear accelerations while the vehicle is in motion. These differing accelerations are caused by horizontal movement in the direction of travel and by vertical movement due to road imperfections. There is, however, no precise explanation as to why certain wheel assemblies will indicate balance under test conditions but are apparently unbalanced under driving conditions.

The balancing machine of this invention has been found by experience to be useful in correcting the discrepancy between balance of the wheel assembly under test conditions and balance under driving conditions.

BRIEF DESCRIPTION OF THE DRAWINGS

Similar reference characters denote similar elements in the various figures of the drawing.

DESCRIPTION OF THE PREFERRED EMBODIMENT

Figure 1:
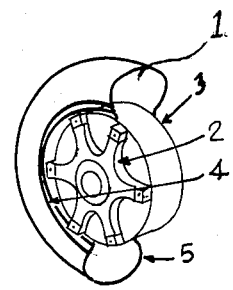
FIG. 1 is an isometric drawing of a wheel assembly consisting of hub, brake drum, rim and tire.

Referring to FIG. 1 in detail, a typical wheel assembly 1 is shown indicating a hub 2, a brake drum 3, a rim 4 and a tire 5.

Figure 2:
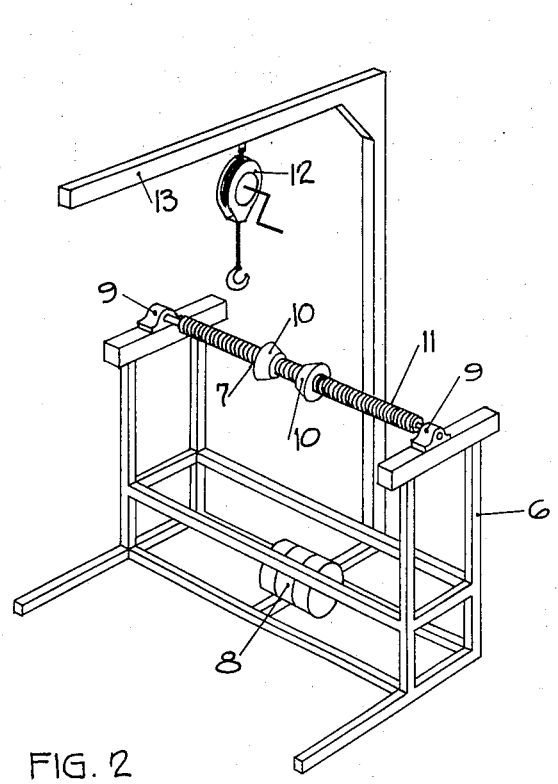
FIG. 2 is an isometric drawing of the balancing machine of this invention.
Figure 3:
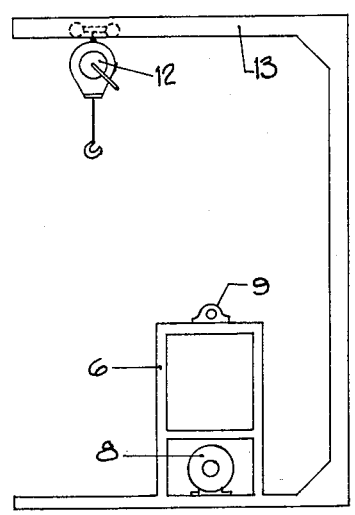
FIG. 3 is a side view of the balancing machine of this invention.
Figure 4:
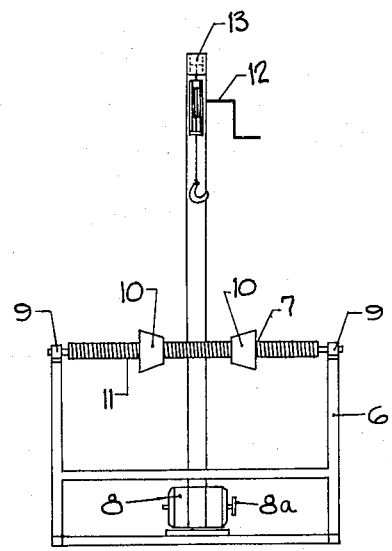
FIG. 4 is a front view of the balancing machine of this invention.

Referring to FIGS. 2, 3 and 4 in detail, the supporting structure 6 of the balancing machine may be constructed from suitable rigid material, a metal framework of structural steel being preferred. Mounted on the supporting structure 6 is the axle assembly 7. Affixed to the supporting structure is a vibrator 8. The vibrator 8 consists of any pulsating electro-magnetic device with energy capability and proper frequency to cause the axle assembly 7 to harmonically vibrate in the vertical as well as horizontal direction. In the preferred embodiment, the vibrator 8 consists of a one-fourth horsepower or smaller electric motor which is deliberately unbalanced by affixing an unbalanced metal disc 8a to its open shaft. The vibrator 8 may be firmly attached anywhere on the supporting structure 6, but should preferably be attached at a central location to assure that each end of the axle assembly 7 will receive equal vibration energy.

The axle assembly 7 is supported at either end by needle bearings 9 which are mounted on either end. In the preferred embodiment, the needle bearings 9 are ball bearings of approximately one-half inch inner diameter. The axle assembly 7 is provided with conical sections 10 which are shaped to fit the bearings of wheel assembly 1. The axle is further provided with threads 11 and are used with conical sections 10 to concentrically center the wheel assembly 1 on the axle assembly.

The machine may be provided with a hand winch 12 mounted on a track 13 for use in raising and lowering wheel assembly 1 and axle assembly 7.

PREFERRED MODE OF OPERATION

In its preferred mode of operation, the invention is first used to balance the hub 2 and brake drum 3 of wheel assembly 1. In practice it has been found that the brake drums of truck-sized vehicles are out of balance by as much as five pounds, and the unbalance becomes progressively worse with use. The hub 2 and drum 3 are placed on the axle assembly 7 and the axle assembly 7 is placed on the vibrating supporting structure 6. The effect of gravity causes the hub 2 and drum 3 to turn until the heaviest part comes to rest at the lowest point. Balancing weights may be temporarily attached by magnetic means or by means of an elastic strap surrounding the drum 3. The balancing weights are positioned on the drum 3 by the operator such that the hub 2 and drum 3 are at balance in any position of rotation. The properly-sized weights are then attached in the proper position by welding or otherwise attaching them to the drum 3 or hub 2.

The foregoing procedure may then be repeated using the entire wheel assembly 1 including the mounted tire 5 and rim 4. Conventional weights may be attached to the wheel rim during this part of the procedure. This part of the procedure may alternatively be accomplished by use of the tire balancing fluid of Clay, U.S. Pat. No. 3,463,551.

Various modifications and changes are contemplated and may be resorted to without departing from the function or scope of the invention, as hereinafter defined by the appended claims.

It is also understood that the balancing machine of this invention is not limited to use in balancing hubs and brake drums but may be used for balancing any rotating device or part thereof.

What I claim is:

1. A balancing machine for hubs and brake drums wherein said machine is comprised of a supporting structure, means for harmonic vibration of said supporting structure in the vertical direction, an axle assembly for holding the hub and brake drum to be balanced, and needle bearings supporting said axle assembly on the supporting structure.

2. The machine of claim 1 wherein a hand winch is mounted on a horizontal track positioned above the axle assembly and attached to the supporting structure.

* * * * *